United States Patent
Sugiyama et al.

(10) Patent No.: US 7,263,391 B2
(45) Date of Patent: Aug. 28, 2007

(54) ELECTRONIC EQUIPMENT

(75) Inventors: Shinya Sugiyama, Hamamatsu (JP); Emi Suzuki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/511,652

(22) PCT Filed: Feb. 26, 2003

(86) PCT No.: PCT/JP03/02144

§ 371 (c)(1),
(2), (4) Date: Apr. 18, 2005

(87) PCT Pub. No.: WO03/088630

PCT Pub. Date: Oct. 23, 2003

(65) Prior Publication Data

US 2005/0176476 A1     Aug. 11, 2005

(30) Foreign Application Priority Data

Apr. 18, 2002  (JP)  .............................. 2002-116250

(51) Int. Cl.
  *H04M 1/00*  (2006.01)
  *H04B 1/08*  (2006.01)
  *H01Q 1/24*  (2006.01)
  *H04N 7/14*  (2006.01)
(52) U.S. Cl. ................ 455/575.3; 455/347; 348/14.02; 343/702

(58) Field of Classification Search ............. 455/550.1, 455/90.1, 575.3, 90, 566, 100, 575, 556.1, 455/90.2, 90.3; 343/702, 700; 348/14.02, 348/14.12, 51, 54
See application file for complete search history.

(56) References Cited

U.S. PATENT DOCUMENTS

| | | | |
|---|---|---|---|
| 6,104,808 A | 8/2000 | Alameh et al. | |
| 6,327,485 B1 * | 12/2001 | Waldron | 455/575.3 |
| 6,829,490 B2 * | 12/2004 | Nakamura et al. | 455/550.1 |
| 6,922,573 B2 * | 7/2005 | Hijii | 455/575.3 |
| 6,996,424 B2 * | 2/2006 | Ijas et al. | 455/575.1 |
| 7,016,703 B2 * | 3/2006 | Kishimoto et al. | 455/566 |

(Continued)

FOREIGN PATENT DOCUMENTS

CN        1215277 A        4/1999

(Continued)

*Primary Examiner*—Naghmeh Mehrpour
(74) *Attorney, Agent, or Firm*—Pearne & Gordon LLP

(57) ABSTRACT

An object of the invention is to provide a foldable electronic apparatus capable of exhibiting satisfactory acoustic characteristics even if the body is thinned and its internal space is made small. In an electronic apparatus according to the invention, a first casing (1) and a second casing (2) can be folded together along a bearing portion (3) and the front face and the back face of one of the first and second casings ((1) or (2)) are formed with respective sound emission holes (8) and (6) that are opposed to each other. A speaker (7) is provided at a position corresponding to the sound emission holes (8) and (6), and the front face of the other body ((2) or (1)) is formed with a through hole (9) that is opposed to the sound emission hole (8) in a state that the first and second casings (1) and (2) are folded together.

8 Claims, 3 Drawing Sheets

U.S. PATENT DOCUMENTS

2002/0068619 A1* 6/2002 Nagai .......................... 455/575
2002/0086711 A1* 7/2002 Flannery ..................... 455/566
2004/0204012 A1* 10/2004 Kakinuma ............... 455/550.1

FOREIGN PATENT DOCUMENTS

| EP | 0 651 546 B1 | 1/2000 |
| JP | 07-131849 | 5/1995 |
| JP | 11-088483 | 3/1999 |

* cited by examiner

ELECTRONIC EQUIPMENT

TECHNICAL FIELD

The present invention relates to electronic apparatus such as a PDA, a cell phone, and a simplified cell phone (PHS (registered trademark)).

BACKGROUND ART

As shown in FIGS. 4-6, for convenience in carrying, an electronic apparatus such as a PDA, a cell phone, or a simplified cell phone (PHS (registered trademark)) generally employs a structure in which a first casing 11 incorporating a display 14 and a second casing 12 incorporating a keyboard 15 are attached so as to freely rotate to each other by a bearing portion 13, and the first casing 11 and the second casing 12 can be folded together. When the electronic apparatus has a foldable structure, it is necessary that a speaker 16 for emitting a ringing sound be provided so as to be directed outward in the state that the first casing 11 and the second casing 12 are folded together so that a sufficiently loud ringing sound is emitted outward even in the state that the first casing 11 and the second casing 12 are folded together. For example, as shown in FIG. 6, the face of the first casing 11 that is opposite to the face having the display 14 is formed with a sound emission hole 17 and the speaker 16 for emitting a ringing sound is provided in the first casing 11 so as to be opposed to the sound emission hole 17.

However, in recent years, the thickness of electronic apparatus of the above kind has decreased rapidly and the display 14 has come to be required to be large. As a result, the internal space of the first casing has become very small. This raises a problem that the driving of the speaker 16 itself is made difficult and hence satisfactory characteristics cannot be obtained.

The present invention has been made in view of the above problems in the art, and an object of the invention is to provide a superior electronic apparatus capable of securing satisfactory characteristics all the time even with a simple structure.

DISCLOSURE OF THE INVENTION

An electronic apparatus according to the present invention is configured as follows A first casing and a second casing can be folded together along a bearing portion. The front face and the back face of one of the first and second casings are formed with respective sound emission holes that are opposed to each other. A speaker is provided at a position corresponding to the sound emission holes.

This configuration provides effects that a sound generated by the speaker can be emitted from both of the front side and the back side of the body, and that a sound generated by the speaker can be heard efficiently in both of a state that the body is opened and a state that the body is folded.

Further, the electronic apparatus is configured in such a manner that the front face of the other of the first and second casings is formed with a through hole that is faced to the sound emission hole in a state that the first and second casings are folded together.

This configuration provides the following effect. Even in the state that the first and second casings are folded together and hence no space exists between the first and second casings, the first and second casings communicate with each other through the sound emission hole and the through hole that are opposed to each other. Therefore, the speaker is driven efficiently and a sufficiently loud sound is emitted outward.

Figure 1:
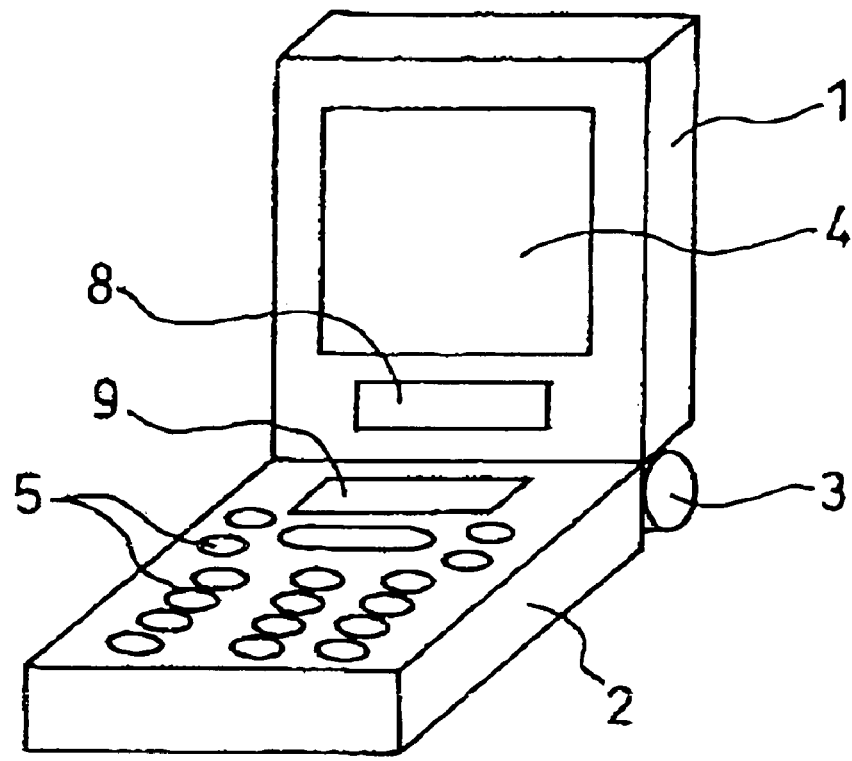
FIG. 1 is a perspective view of an electronic apparatus according to an embodiment of the present invention.

In the drawings, reference numeral 1 denotes a first casing; 2, a second casing; 3, a bearing portion; 4, a display; 5, keys; 6, a sound emission hole; 7, a speaker; 8, a sound emission hole; and 9, a through hole.

BEST MODE FOR CARRYING OUT THE INVENTION

An embodiment of the present invention will be hereinafter described with reference to the drawings.

Figure 2:
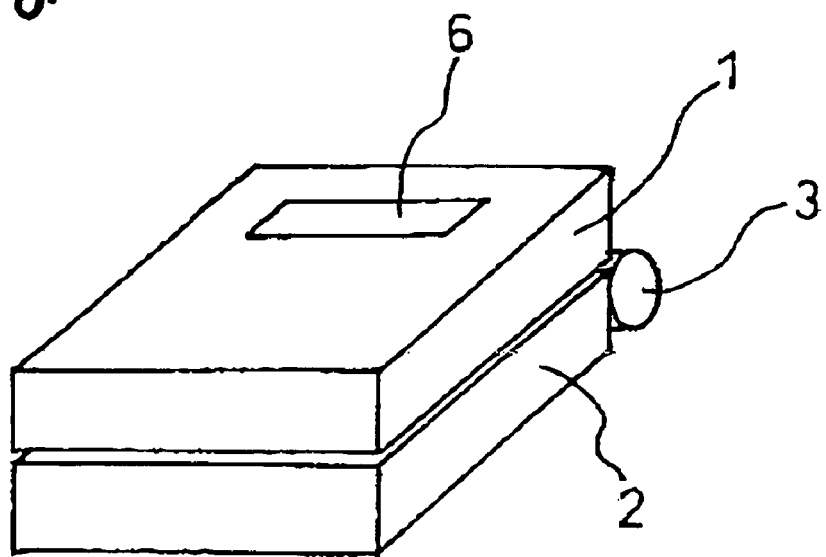
FIG. 2 is a perspective view of the electronic apparatus according to the embodiment of the invention in a state that its first and second casings are folded together.
Figure 3:
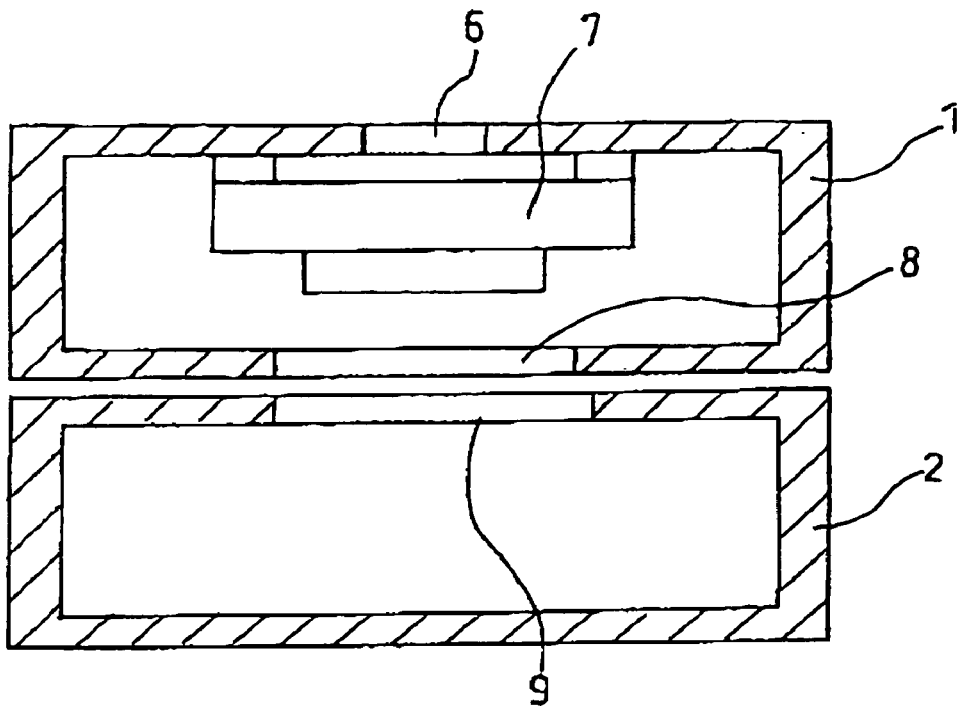
FIG. 3 is a side sectional view of an important part of the electronic apparatus according to the embodiment of the invention in the state that its first and second casings are folded together.
Figure 4:
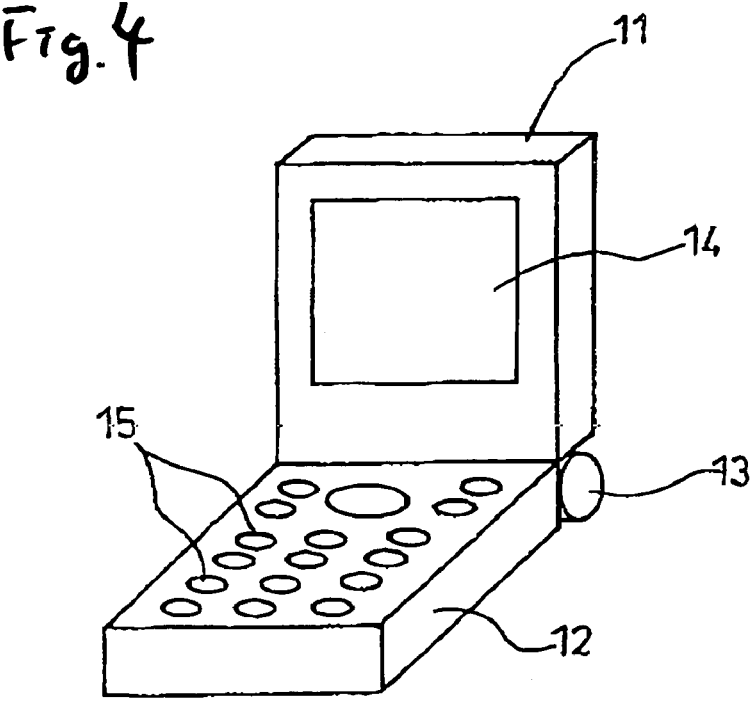
FIG. 4 is a perspective view of a conventional electronic apparatus.
Figure 5:
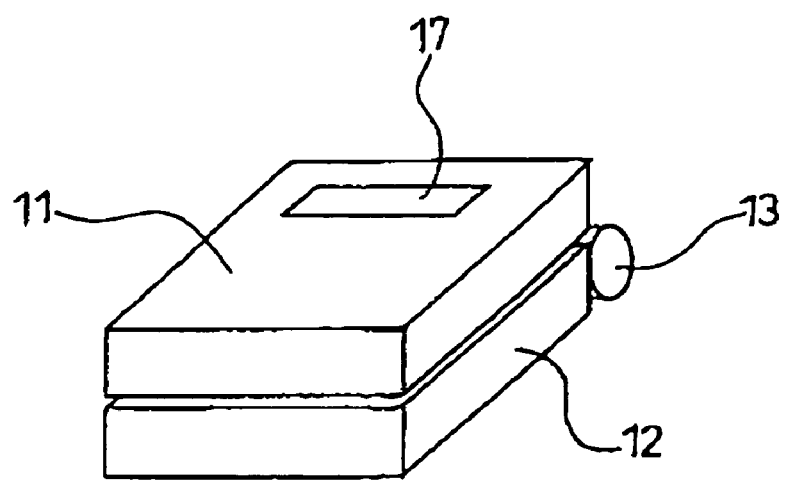
FIG. 5 is a perspective view of the conventional electronic apparatus in a state that its first and second casings are folded together.
Figure 6:
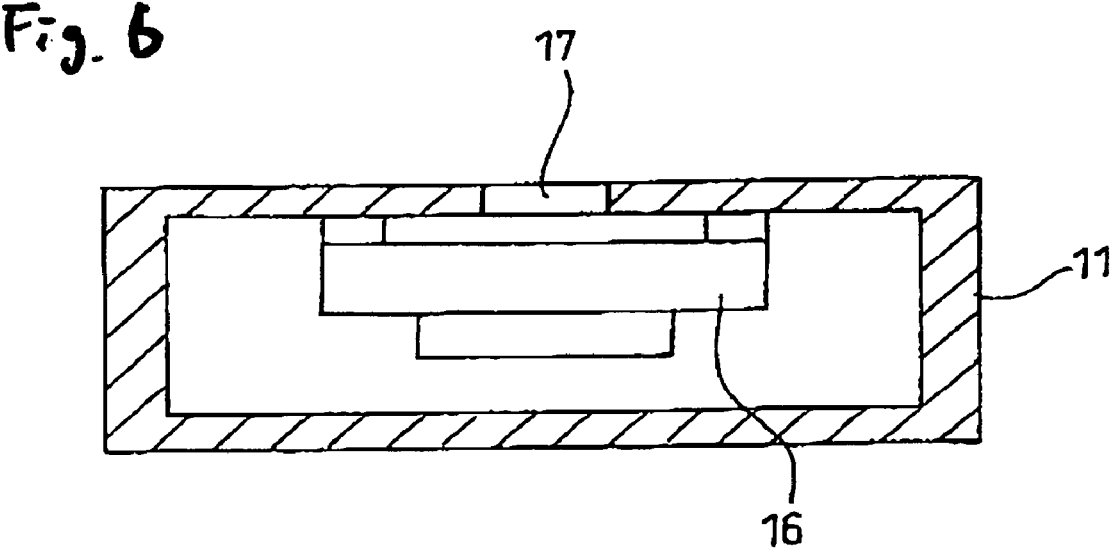
FIG. 6 is a side sectional view of an important part of the conventional electronic apparatus in the state that its first and second casings are folded together.

FIG. 1 is a perspective view of an electronic apparatus according to the embodiment of the invention. FIG. 2 is a perspective view of the same electronic apparatus in a state that it is folded. FIG. 3 is a side sectional view of an important part of the same electronic apparatus in the state that it is folded.

As shown in FIGS. 1-3, the electronic apparatus according to the embodiment of the invention includes a first casing 1 in which a display 4 is provided on the front side thereof and a second casing 2 in which various kinds of keys 5 are provided also on the front side thereof. The first casing 1 and the second casing 2 are attached so as to freely rotate to each other by a bearing portion 3.

The back face of the first casing 1, that is, the face that is located outside in the state of FIG. 2 that the first casing 1 and the second casing 2 are folded together, is formed with a first sound emission hole 6. A speaker 7 for emitting a ringing sound, a speech sound, etc. is provided inside the first casing 1 so as to be opposed to the sound emission hole 6. Further, the front face of the first casing 1 is formed with a sound emission hole 8 that is opposed to the speaker 7, and the front face of the second casing 2 is formed with a through hole 9 that is opposed to the sound emission hole 8. That is, as shown in FIG. 3, the sound emission hole 8 and the through hole 9 are opposed to each other in the state of FIG. 2 that the first casing 1 and the second casing 2 are folded together.

Although not shown in any drawings, each of the sound emission holes 6 and 8 and the through hole 9 is provided with, as appropriate, a mesh-like protective film, decorative plate, or the like capable of transmitting sound.

As described above, in the electronic apparatus according to the embodiment, the sound emission holes 8 and 6 are provided on the front face and the back face of the first casing 1 respectively, and the speaker 7 for emitting a ringing sound, a speech sound, etc. is provided at such a position as to be opposed to the sound emission holes 8 and 6. This structure provides the following advantage. Even if the internal space of the first casing 1 is made small because the first casing 1 is thinned and the display 4 is increased in size, a sound generated by the speaker 7 can be emitted outward efficiently through the sound emission holes 8 and 6 that are formed on the front side and the back side of the first casing 1, respectively, and hence good acoustic characteristics can always be secured. In particular, this embodiment provides the following advantage. Since the sound emission holes 8 and 6 are provided on the front side and the back side of the first casing 1, respectively, a sound generated by the speaker 7 can be heard directly through the sound emission holes 8 and 6 in both of the state (of FIG. 1) that the first casing 1 and the second casing 2 are opened and the state (of FIG. 2) that the first casing 1 and the second casing 2 are closed. This structure allows a user to hear a loud sound and hence easily recognize the sound.

The embodiment also provides the following advantage. The through hole 9 is formed on the front side of the second casing 2 at such a position as to be opposed to the sound emission hole 8. Therefore, even in the state (of FIG. 2) that the first casing 1 and the second casing 2 are folded together and no space exists between the first casing 1 and the second casing 2, the inside spaces of the first casing 1 and the second casing 2 communicate with each other through the sound emission hole 8 and the through hole 9. The space behind the speaker 7 is substantially enlarged, so that the speaker 7 is driven efficiently. At the same time, this leads to improvement in the acoustic characteristics of the speaker 7 and hence serves to secure good acoustic characteristics.

In this embodiment, the speaker 7 is provided so as to be directed to the sound emission hole 6. However, the invention is not limited to such a configuration. The speaker 7 may be provided so as to be directed to the sound emission hole 8. Further, although the embodiment is such that the speaker 7 and the sound emission holes 6 and 8 are provided in the first casing 1 and the through hole 9 is provided in the second casing 2, another structure is possible in which the speaker 7 and the sound emission holes 6 and 8 are provided in the second casing 2 and the through hole 9 is provided in the first casing 1.

Although the invention has been described in detail by referring to the particular embodiment, it is apparent to a person skilled in the art that various changes and modifications are possible without departing the spirit and scope of the invention.

This application is based on Japanese Patent Application No. 2002-116250 filed on Apr. 18, 2002, the disclosure of which is incorporated herein by reference.

INDUSTRIAL APPLICABILITY

As described above, the invention provides the advantages that a sound generated by the speaker can be emitted from both of the front side and the back side of the body, and that even if the body is thinned and the internal space is made small, the speaker can be driven efficiently and a sound generated by the speaker can be heard efficiently in both of the state that the body is opened and the state that the body is folded.

The invention claimed is:

1. An electronic apparatus, comprising:
   a first casing and a second casing which are foldable to each other along a bearing portion,
   wherein a front face and a back face of one of the first casing and the second casing are formed with respective sound emission holes that are aligned with each other; and
   wherein a speaker is provided at a position corresponding to the sound emission holes, and further wherein a front face of the other of the first casing and the second casing is formed with a through hole that is aligned with the sound emission holes in a state that the first casing and the second casing are folded together.

2. The electronic apparatus as set forth in claim 1, further comprising a display and a keypad, wherein the display is located on one of the first casing and the second casing and the keypad is located on the other of the first casing and the second casing.

3. The electronic apparatus as set forth in claim 2, wherein the sound emission holes and the display are located on the same one of the first casing and the second casing.

4. The electronic apparatus as set forth in claim 2, wherein the through hole and the keypad are located on the same one of the first casing and the second casing.

5. An electronic apparatus, comprising:
   a first casing and a second casing which are foldable to each other along a bearing portion,
   a display which is located on the first casing;
   a keypad which is located on the second casing;
   wherein a front face and a back face of the first casing are formed with respective sound emission holes that are aligned with each other and are located nearer to the bearing portion than the display; and
   wherein a speaker is provided at a position corresponding to the sound emission holes.

6. The electronic apparatus as set forth in claim 5, wherein a front face of the second casing is formed with a through hole that is opposed to the sound emission holes in a state that the first casing and the second casing are folded together.

7. An electronic apparatus, comprising:
   a first casing and a second casing which are foldable to each other along a bearing portion,
   a display which is located on the first casing;
   a keypad which is located on the second casing;
   wherein a front face and a back face of the second casing are formed with respective sound emission holes that are aligned with each other; and
   wherein a speaker is provided at a position corresponding to the sound emission holes.

8. The electronic apparatus as set forth in claim 7, wherein a front face of the first casing is formed with a through hole that is opposed to the sound emission holes in a state that the first casing and the second casing are folded together.

* * * * *